United States Patent Office 3,121,023

Patented Feb. 11, 1964

3,121,023
CHEMICALLY DEPOSITED LEAD SELENIDE PHOTOCONDUCTIVE CELLS

Harry E. Spencer and John V. Morgan, Rochester, N.Y., assignors to Eastman Kodak Company, Rochester, N.Y., a corporation of New Jersey No Drawing. Filed Feb. 25, 1957, Ser. No. 642,318
4 Claims. (Cl. 117—229)

This invention relates to photoconductive cells. In one of its specific aspects, this invention relates to the manufacture of infra-red sensitive lead selenide photoconductive cells.

The photosensitivity of lead sulfide and lead selenide has been known for some time and one of the procedures used to prepare photoconductive or photosensitive lead sulfide cells involves a chemical deposition procedure. In accordance with this procedure, an aqueous alkaline solution of a lead salt, such as lead nitrate, is mixed with an aqueous alkaline thiourea solution, and after a suitable period of time, a glass plate or other surface to be coated with lead sulfide is immersed in the resulting mixture. Subsequently, the glass plate or other surface is removed from the bath containing the coating mixture and washed and dried to form the desired photoconductive cell.

The production of lead sulfide photoconductive cells by a chemical deposition procedure is a relatively simple operation. However, the production of lead selenide photoconductive cells by a similar chemical deposition procedure is considerably more difficult. For example, in producing lead selenide photoconductive cells by chemical deposition, the chemical reactions usually employed in the process proceed much too rapidly. Consequently, it is quite difficult to produce a lead selenide photoconductive film by chemical deposition that will adhere satisfactorily to the glass plate or other suitable substrate.

In accordance with this invention, it has been found that lead selenide photoconductive films can be produced on a substrate in a satisfactory manner by a chemical deposition procedure wherein arsenite ions are present in the mixture used for coating the substrate.

In practicing this invention, an aqueous solution of an alkali metal hydroxide, such as sodium hydroxide, is formed. An aqueous solution of a lead salt, such as lead nitrate, is added to the alkaline solution, and the resulting mixture is maintained at a temperature within the range of about 5 to 40° C. A second solution of alkali metal hydroxide is prepared and an alkali metal arsenite, such as sodium arsenite, is added to the second alkaline solution. Immediately before beginning the reaction for formation of lead selenide, a derivative of selenourea, such as N,N-dimethylselenourea, is added to the alkaline solution containing the alkali metal arsenite. The two alkaline solutions are then mixed and the resulting mixture is poured immediately into vials or other containers into which glass slides have been placed. The glass slides are in the containers in such a position that they do not stand upright, but tilt so that there is a small angle between the bottom of the container and the glass slide. The sides of the vials become coated with a mirror-like deposit of lead selenide in a period of 1 to 3 minutes. In a period of 3 to 15 minutes, the formation and deposition of lead selenide on the glass plates has proceeded to the point where the reaction mixture can be poured out of the vials and the slides thoroughly rinsed with water. The lead selenide layer thus produced has a thickness of the order of 0.1 micron.

In the manner described above, it is possible to coat glass plates on other suitable substrates with lead selenide in a manner such that the lead selenide adheres satisfactorily to the substrate. The presence of the arsenite ions appears to control the rate of reaction forming the lead selenide in a manner making it possible for the lead selenide to coat satisfactorily the substrate. In some instances, it is necessary to overcoat the substrate containing the lead selenide film with a layer of lead sulfide to protect the lead selenide film from loss of photosensitivity upon exposure to the atmosphere and to produce a photosensitive cell having desirable physical characteristics. A suitable method of carrying out such overcoating is described in the copending application of H. E. Spencer, Serial No. 642,319, filed February 25, 1957, and it involves placing the substrate containing the lead selenide photoconductive layer in a suitable lead sulfide coating solution.

The cells of this invention are photosensitive to infrared radiation. Some of these cells have a photosensitivity to wavelengths up to and, in some instances, longer than 5 microns. A maximum in spectral response usually occurs between 3 and 4 microns. The time constant of these cells at room temperature is less than 20 microseconds.

The following examples are illustrative of lead selenide reaction mixtures that can be employed to produce suitable and satisfactory lead selenide photoconductive films in the manner described heretofore.

*Example 1*

The following two solutions were prepared and maintained at a temperature of 23° C.

Solution 1:
- 25 cc. water
- 7.5 cc. 3.5 molar $OH^-$ (sodium hydroxide)
- 7.5 cc. 0.3 molar $Pb^{++}$ (lead nitrate)

Solution 2:
- 1.0 cc. 0.1 molar $AsO_2^-$ (sodium arsenite)
- 0.8 cc. 3.5 molar $OH^-$ (sodium hydroxide) diluted to 100 cc. distilled water.

Immediately before mixing solution 1 and solution 2, 0.225 gram of N,N-dimethylselenourea was dissolved in solution 2. After mixing, the solutions were poured into vials containing glass slides. In a period of 3 to 15 minutes, the slides had been satisfactorily coated with lead selenide.

*Example 2*

In a procedure similar to Example 1, the following solutions were employed to form lead selenide photoconductive films.

Solution 1:
- 25 cc. $H_2O$
- 5 cc. 3.5 molar $OH^-$
- 5 cc. 0.3 molar $Pb^{++}$ Solution 2:
- 2.0 cc. 0.1 molar $AsO_2^-$
- 2.0 cc. 3.5 molar $OH^-$
- 96 cc. water
- 0.15 gram N,N-dimethylselenourea

*Example 3*

In a procedure similar to Example 1, the following solutions were employed to form lead selenide photoconductive films.

Solution 1:
- 25 cc. $H_2O$
- 7.5 cc. 3.5 molar $OH^-$
- 7.5 cc. 0.3 molar $Pb^{++}$ Solution 2:
- 1.8 cc. 0.1 molar $AsO_2^-$
- 1.5 cc. 3.5 molar $OH^-$ diluted to 100 cc.
- 0.225 g. N,N-dimethylselenourea The lower limit of arsenite concentration in the lead selenide reaction mixtures is the lowest concentration at which lead selenide film formation is obtained. The upper limit of arsenite concentration is below the concentration at which lead arsenite precipitates in the lead selenide film. Satisfactory results can be obtained when the arsenite concentration is within the range of 0.0007 to 0.0015 molar.

We claim:

1. The method for producing a lead selenide photoconductive film adherent to a substrate which comprises reacting lead nitrate with N,N-dimethylselenourea at a temperature within the range of 5–40° C. in an aqueous alkaline solution and in the presence of sufficient arsenite ions to reduce substantially the rate of reaction and to form a lead selenide precipitate, and immersing a substrate to be coated with said lead selenide precipitate in the resulting reaction mixture for a period of 3–15 minutes.

2. The method according to claim 1 wherein the arsenite ion concentration in the reaction mixture is within the range of 0.0007 to 0.0015 molar.

3. The method for producing a lead selenide photoconductive film adherent to a glass substrate which comprises preparing a first aqueous solution containing sodium hydroxide and lead nitrate and a second aqueous solution containing sodium hydroxide and sodium arsenite in an amount sufficient to produce an arsenite ion concentration of 0.0007 to 0.0015 molar in the final reaction mixture, adding N,N-dimethylselenourea to said second solution and immediately thereafter mixing said first and said second solutions to react said lead nitrate with said N,N-dimethylselenourea at a temperature of 5 to 40° C. to form a reaction mixture containing lead selenide precipitate, immersing a glass substrate in the resulting reaction mixture containing lead selenide for a period of 3 to 15 minutes to deposit a photosensitive layer of lead selenide on said glass plate.

4. A photosensitive lead selenide cell prepared by reacting lead nitrate with N,N-dimethylselenourea at a temperature of 5–40° C. in an aqueous alkaline solution and in the presence of sufficient arsenite ions to reduce substantially the rate of reaction and to form a lead selenide precipitate and immersing a substrate to be coated with said lead selenide precipitate in the resulting reaction mixture for a period of 3 to 15 minutes.

No references cited.